(12) United States Patent  
Dandu et al.

(10) Patent No.: US 9,202,039 B2  
(45) Date of Patent: Dec. 1, 2015

(54) SECURE IDENTIFICATION OF COMPUTING DEVICE AND SECURE IDENTIFICATION METHODS

(71) Applicant: Microsoft Corporation, Redmond, WA (US)

(72) Inventors: Srinivas Dandu, Bellevue, WA (US); Peter Ciskowski, Snohomish, WA (US); Tolga Acar, Redmond, WA (US); Joao Lucas Guberman Raza, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 474 days.

(21) Appl. No.: 13/646,446

(22) Filed: Oct. 5, 2012

(65) Prior Publication Data

US 2014/0101731 A1    Apr. 10, 2014

(51) Int. Cl.
*G06F 21/44* (2013.01)
*G06F 21/62* (2013.01)

(52) U.S. Cl.
CPC ............ *G06F 21/44* (2013.01); *G06F 21/6263* (2013.01)

(58) Field of Classification Search
CPC ...................................................... G06F 21/44
USPC ............................................................ 726/5
See application file for complete search history.

(56) References Cited

U.S. PATENT DOCUMENTS

| 8,037,097 | B2 | 10/2011 | Guo et al. | |
| 8,095,803 | B1 * | 1/2012 | Carter et al. | 713/193 |
| 8,438,184 | B1 * | 5/2013 | Wang et al. | 707/780 |
| 2008/0313088 | A1 * | 12/2008 | Cahn | 705/67 |
| 2009/0300723 | A1 * | 12/2009 | Nemoy et al. | 726/4 |
| 2011/0313870 | A1 | 12/2011 | Eicher et al. | |
| 2012/0243681 | A1 * | 9/2012 | Francis | 380/44 |

FOREIGN PATENT DOCUMENTS

| EP | 2273417 | 1/2011 |
| WO | WO2005/107110 | 11/2005 |

OTHER PUBLICATIONS

Bell, K., "Groupon Adopts UDID Alternative That Could Become Standard for Developers," Retrieved on: Aug. 2, 2012, Available at: http://www.cultofmac.com/157611/appredeem-creates-an-alternative-to-udid-that-it-is-encouraging-developers-to-adopt/.

(Continued)

*Primary Examiner* — William Powers
(74) *Attorney, Agent, or Firm* — Timothy Churna; Judy Yee; Micky Minhas

(57) ABSTRACT

A method implemented on a computing device provides for identifying the device and/or a user to an application on the device. The method comprises receiving a function call for a public identifier, responding to the function call, performing a hash operation and returning the public identifier. Responding to the function call comprises requesting a publisher ID from a first memory location within the device and requesting a private ID from a second memory location. Performing a hash operation on the publisher ID and the private ID creates the public identifier. The public identifier is then returned to the application. A method of allowing a developer to test an application on a mobile device or emulator is also described. A mobile device programmed to return a public identifier to an application is also described.

16 Claims, 7 Drawing Sheets

(56) References Cited

OTHER PUBLICATIONS

Creighton, B., "A Brief Field Guide to Post-UDID Unique IDs on iOS," Published on: Apr. 30, 2012, Available at: http://www.veracode.com/blog/2012/04/a-brief-field-guide-to-post-udid-unique-ids-on-ios/.

"Finally, a UDID Solution That's Secure and Respects Privacy," Published on: Aug. 19, 2011, Available at: http://www.secureudid.org/.

Harris, N., "Windows Phone 7—How to find the device unique id windows live anonymous Id and manufacturer," Published on Sep. 30, 2010, Available at: http://www.nickharris.net/2010/09/windows-phone-7-how-to-find-the-device-unique-id-windows-live-anonymous-id-and-manufacturer/.

Ouriel, "OpenUDID: A Tale in Open Source Netiquette," Published on: Mar. 28, 2012, Available at: http://blog.appsfire.com/openudid-a-tale-in-open-source-netiquette/.

Palli, C., "Thriving Amid an Explosion of UDID Alternatives", Published on: Apr. 22, 2012, Available at: http://techcrunch.com/2012/04/22/udid-alternatives/.

Slivka, E., "Apple Phasing Out Developer Access to UDIDs in iOS 5", Published on: Aug. 19, 2011, Available at: http://www.macrumors.com/2011/08/19/apple-phasing-out-developer-access-to-udids-in-ios-5/.

Smith, E., "iPhone Applications & Privacy Issues: An Analysis of Application Transmission of iPhone Unique Device Identifiers (UDIDs)", Published on: Oct. 1, 2010, Available at: http://www.pskl.us/wp/wp-content/uploads/2010/09/iPhone-Applications-Privacy-Issues.pdf.

International Search Report & Written Opinion for PCT Patent Application No. PCT/US2013/060235, Filed Sep. 18, 2013, 11 Pages (mailed May 9, 2014).

* cited by examiner

SECURE IDENTIFICATION OF COMPUTING DEVICE AND SECURE IDENTIFICATION METHODS

BACKGROUND

Identification of computing devices is important to content providers, including publishers of computing applications. Publishers use analytics to determine what content is desired by particular users. Analysis of usage patterns allows a publisher to improve its applications. In some cases, however, too much usage data, or usage data that is shared too broadly, can create user security concerns.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In one embodiment, a method implemented on a computing device provides for identifying the device and/or a user to an application on the device. The method comprises receiving a function call for a public identifier, and responding to the function call by requesting a publisher ID from a first memory location within the device and requesting private data from a second memory location within the device. A hash operation is performed on the publisher ID and the private data to create the public identifier. The public identifier is returned to the application.

The public identifier can be unique to the application's publisher.

The public identifier can be a first public identifier, and the method can include creating a second public identifier. In this case, the method includes responding to the function call by requesting additional private data from a third memory location, performing a hash operation on the publisher ID and the additional private data, and returning the second public identifier to the application.

Responding to the function call can comprise accessing a publisher name, a private device unique ID and/or a private anonyms identifier from an operating system of the device. At least one of the first memory location and the second memory location can comprise a location in the binary. At least one of requesting a publisher ID and requesting private data can comprise accessing a secure area of the device.

In another embodiment, a method allows a publisher to test an application on a computing device. In this way, the developer can ensure that the application works as intended before the application is widely released. The method comprises receiving a publisher ID assigned by the publisher, associating the publisher ID received from the publisher together with a deployment copy of the application and deploying the deployment copy of the application to the computing device with the associated publisher ID.

The publisher ID may be obtained through a developer tools website, e.g., such as when the developer logs in with appropriate credentials.

In another embodiment, a mobile device has at least one application seeking to identify the mobile device and/or user of the device. The mobile device comprises a processor, a memory link to the processor and having at least a first memory location and a second memory location. A publisher ID is stored in the first memory location, and private data is stored in the second memory location. The memory also has instructions that cause the processor to perform operations, including receiving a function call for a public identifier, responding to the function call by requesting the publisher ID from the first memory location and requesting private data from the second memory location, and performing a hash operation on the publisher ID and the private data to create a public identifier. The public identifier is then returned to the application.

The foregoing and other objects, features, and advantages of the invention will become more apparent from the following detailed description, which proceeds with reference to the accompanying figures.

DETAILED DESCRIPTION

As used in this application and in the claims, the singular forms "a," "an," and "the" include the plural forms unless the context clearly dictates otherwise. Similarly, the word "or" is intended to include "and" unless the context clearly indicates otherwise. The term "comprising" means "including;" hence, "comprising A or B" means including A or B, as well as A and B together. Additionally, the term "includes" means "comprises."

Figure 1:
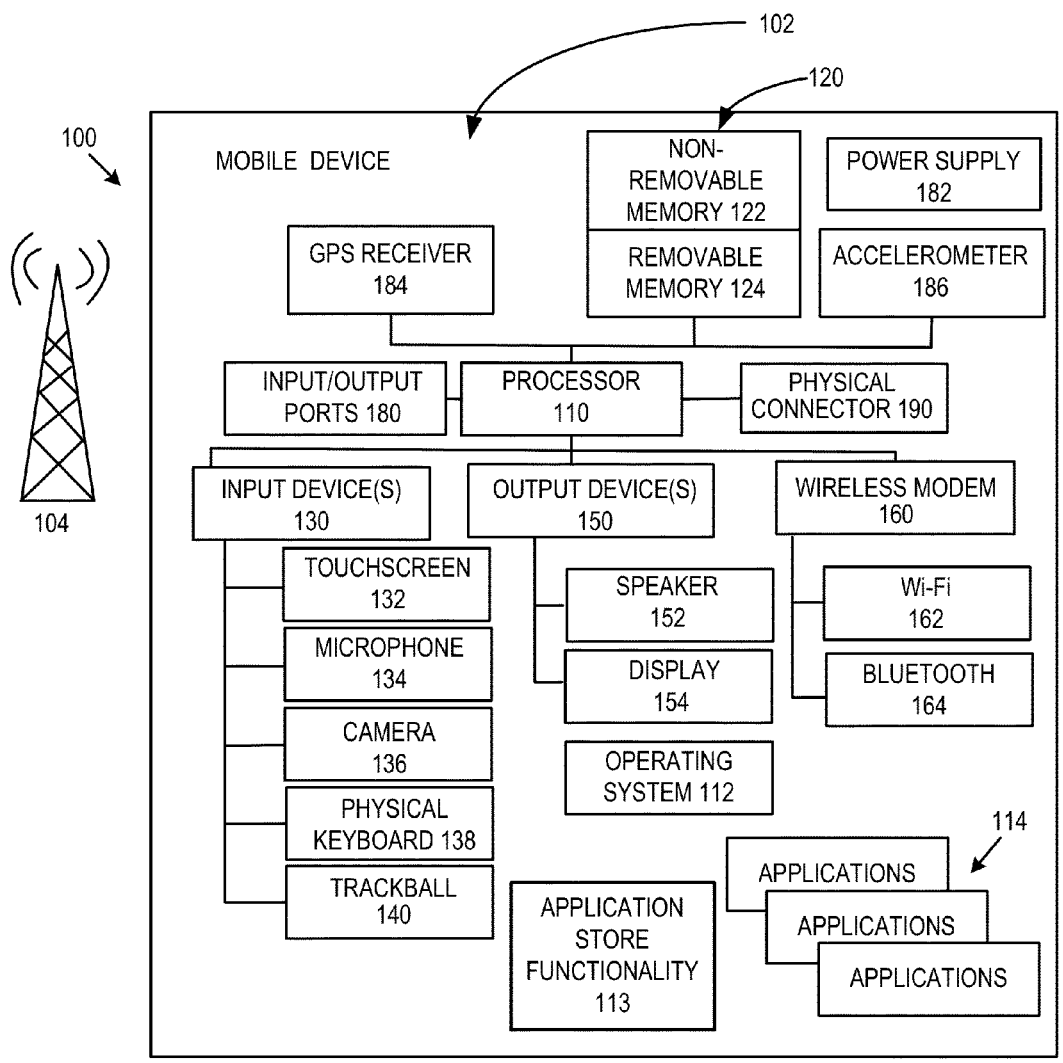
FIG. 1 is a system diagram of an exemplary mobile device.

FIG. 1 is a system diagram depicting an exemplary mobile device 100 including a variety of optional hardware and software components, shown generally at 102. Any components 102 in the mobile device can communicate with any other component, although not all connections are shown, for ease of illustration. The mobile device can be any of a variety of computing devices (e.g., cell phone, smartphone, handheld computer, Personal Digital Assistant (PDA), etc.) and can allow wireless two-way communications with one or more mobile communications networks 104, such as a cellular or satellite network.

The illustrated mobile device 100 can include a controller or processor 110 (e.g., signal processor, microprocessor, ASIC, or other control and processing logic circuitry) for performing such tasks as signal coding, data processing, input/output processing, power control, and/or other functions. An operating system 112 can control the allocation and usage of the components 102 and support for one or more application programs 114 ("applications"). The application programs can include common mobile computing applications (e.g., email applications, calendars, contact managers, web browsers, messaging applications), or any other computing application. Functionality 113 for accessing an application store can also be used for acquiring and updating applications 114.

The illustrated mobile device 100 can include memory 120. Memory 120 can include non-removable memory 122 and/or removable memory 124. The non-removable memory 122 can include RAM, ROM, flash memory, a hard disk, or other well-known memory storage technologies. The removable memory 124 can include flash memory or a Subscriber Identity Module (SIM) card, which is well known in GSM communication systems, or other well-known memory storage technologies, such as "smart cards." The memory 120 can be used for storing data and/or code for running the operating system 112 and the applications 114. Example data can include web pages, text, images, sound files, video data, or other data sets to be sent to and/or received from one or more network servers or other devices via one or more wired or wireless networks. The memory 120 can be used to store a subscriber identifier, such as an International Mobile Subscriber Identity (IMSI), and an equipment identifier, such as an International Mobile Equipment Identifier (IMEI), which are transmitted to a network server to identify users and equipment. Described below are new approaches to identification.

The mobile device 100 can support one or more input devices 130, such as a touchscreen 132, microphone 134, camera 136, physical keyboard 138 and/or trackball 140 and one or more output devices 150, such as a speaker 152 and a display 154. Other possible output devices (not shown) can include piezoelectric or other haptic output devices. Some devices can serve more than one input/output function. For example, touchscreen 132 and display 154 can be combined in a single input/output device. The input devices 130 can include a Natural User Interface (NUI). An NUI is any interface technology that enables a user to interact with a device in a "natural" manner, free from artificial constraints imposed by input devices such as mice, keyboards, remote controls, and the like. Examples of NUI methods include those relying on speech recognition, touch and stylus recognition, gesture recognition both on screen and adjacent to the screen, air gestures, head and eye tracking, voice and speech, vision, touch, gestures, and machine intelligence. Other examples of a NUI include motion gesture detection using accelerometers/gyroscopes, facial recognition, 3D displays, head, eye , and gaze tracking, immersive augmented reality and virtual reality systems, all of which provide a more natural interface, as well as technologies for sensing brain activity using electric field sensing electrodes (EEG and related methods). Thus, in one specific example, the operating system 112 or applications 114 can comprise speech-recognition software as part of a voice user interface that allows a user to operate the device 100 via voice commands. Further, the device 100 can comprise input devices and software that allows for user interaction via a user's spatial gestures, such as detecting and interpreting gestures to provide input to a gaming application.

A wireless modem 160 can be coupled to an antenna (not shown) and can support two-way communications between the processor 110 and external devices, as is well understood in the art. The modem 160 is shown generically and can include a cellular modem for communicating with the mobile communication network 104 and/or other radio-based modems (e.g., Bluetooth 164 or Wi-Fi 162). The wireless modem 160 is typically configured for communication with one or more cellular networks, such as a GSM network for data and voice communications within a single cellular network, between cellular networks, or between the mobile device and a public switched telephone network (PSTN).

The mobile device can further include at least one input/output port 180, a power supply 182, a satellite navigation system receiver 184, such as a Global Positioning System (GPS) receiver, an accelerometer 186, and/or a physical connector 190, which can be a USB port, IEEE 1394 (FireWire) port, and/or RS-232 port. The illustrated components 102 are not required or all-inclusive, as any components can be deleted and other components can be added.

Figure 2:
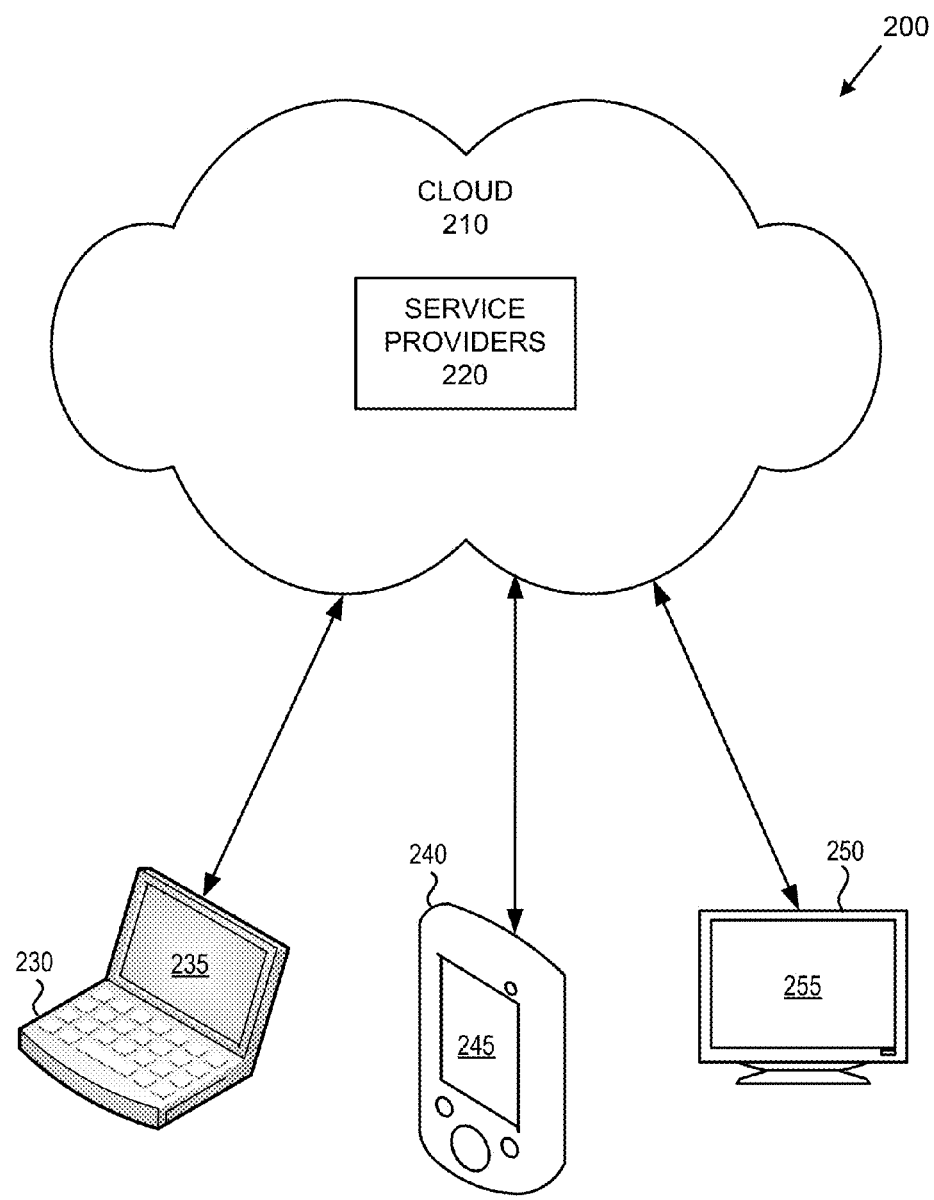
FIG. 2 illustrates a generalized example of a suitable implementation environment in which describes embodiments, techniques and technologies may be implemented.

FIG. 2 illustrates a generalized example of a suitable implementation environment 200 in which described embodiments, techniques, and technologies may be implemented.

In example environment 200, various types of services (e.g., computing services) are provided by a cloud 210. For example, the cloud 210 can comprise a collection of computing devices, which may be located centrally or distributed, that provide cloud-based services to various types of users and devices connected via a network such as the Internet. The implementation environment 200 can be used in different ways to accomplish computing tasks. For example, some tasks (e.g., processing user input and presenting a user interface) can be performed on local computing devices (e.g., connected devices 230, 240, 250) while other tasks (e.g., storage of data to be used in subsequent processing) can be performed in the cloud 210.

In example environment 200, the cloud 210 provides services for connected devices 230, 240, 250 with a variety of screen capabilities. Connected device 230 represents a device with a computer screen 235 (e.g., a mid-size screen). For example, connected device 230 could be a personal computer such as desktop computer, laptop, notebook, netbook, or the like. Connected device 240 represents a device with a mobile device screen 245 (e.g., a small size screen). For example, connected device 240 could be a mobile phone, smart phone, personal digital assistant, tablet computer, or the like. Connected device 250 represents a device with a large screen 255. For example, connected device 250 could be a television screen (e.g., a smart television) or another device connected to a television (e.g., a set-top box or gaming console) or the like. One or more of the connected devices 230, 240, 250 can include touchscreen capabilities. Touchscreens can accept input in different ways. For example, capacitive touchscreens detect touch input when an object (e.g., a fingertip or stylus) distorts or interrupts an electrical current running across the surface. As another example, touchscreens can use optical sensors to detect touch input when beams from the optical sensors are interrupted. Physical contact with the surface of the screen is not necessary for input to be detected by some touchscreens. Devices without screen capabilities also can be used in example environment 200. For example, the cloud 210 can provide services for one or more computers (e.g., server computers) without displays.

Services can be provided by the cloud 210 through service providers 220, or through other providers of online services (not depicted). For example, cloud services can be customized to the screen size, display capability, and/or touchscreen capability of a particular connected device (e.g., connected devices 230, 240, 250).

In example environment 200, the cloud 210 provides the technologies and solutions described herein to the various connected devices 230, 240, 250 using, at least in part, the service providers 220. For example, the service providers 220 can provide a centralized solution for various cloud-based services. The service providers 220 can manage service subscriptions for users and/or devices (e.g., for the connected devices 230, 240, 250 and/or their respective users).

Figure 3:
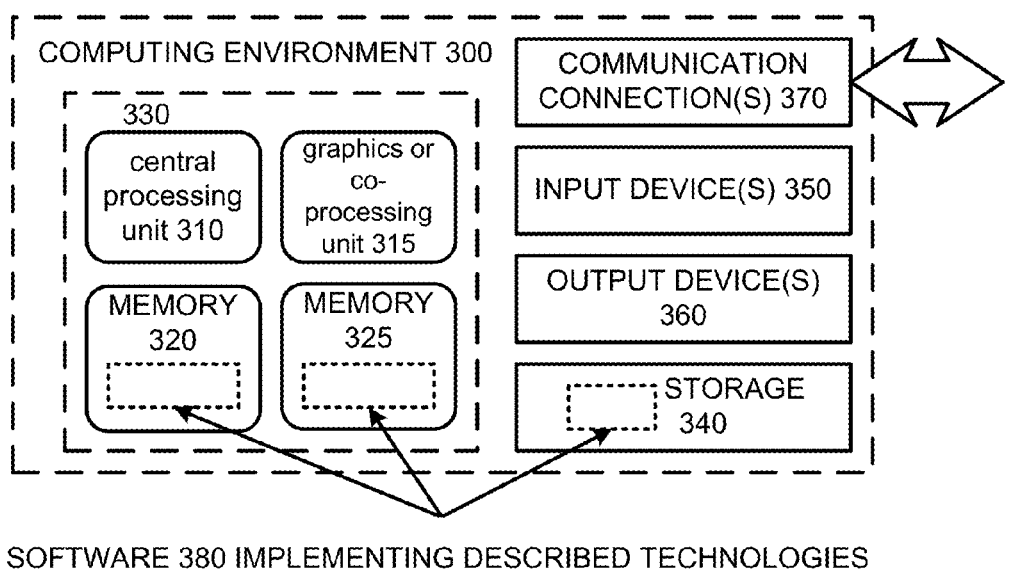
FIG. 3 is a block diagram showing another generalized example of a suitable computing environment.

FIG. 3 depicts a generalized example of a suitable computing environment 300 in which the described innovations may be implemented. The computing environment 300 is not intended to suggest any limitation as to scope of use or functionality, as the innovations may be implemented in diverse general-purpose or special-purpose computing systems. For example, the computing environment 300 can be any of a variety of computing devices (e.g., desktop computer, laptop computer, server computer, tablet computer, media player, gaming system, mobile device, etc.)

With reference to FIG. 3, the computing environment 300 includes one or more processing units 310, 315 and memory 320, 325. In FIG. 3, this basic configuration 330 is included within a dashed line. The processing units 310, 315 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 3 shows a central processing unit 310 as well as a graphics processing unit or co-processing unit 315. The tangible memory 320, 325 may be volatile memory (e.g., registers, cache, RAM), non-volatile memory (e.g., ROM, EEPROM, flash memory, etc.), or some combination of the two, accessible by the processing unit(s). The memory 320, 325 stores software 380 implementing one or more innovations described herein, in the form of computer-executable instructions suitable for execution by the processing unit(s).

A computing system may have additional features. For example, the computing environment 300 includes storage 340, one or more input devices 350, one or more output devices 360, and one or more communication connections 370. An interconnection mechanism (not shown) such as a bus, controller, or network interconnects the components of the computing environment 300. Typically, operating system software (not shown) provides an operating environment for other software executing in the computing environment 300, and coordinates activities of the components of the computing environment 300.

The tangible storage 340 may be removable or non-removable, and includes magnetic disks, magnetic tapes or cassettes, CD-ROMs, DVDs, or any other medium which can be used to store information in a non-transitory way and which can be accessed within the computing environment 300. The storage 340 stores instructions for the software 380 implementing one or more innovations described herein.

The input device(s) 350 may be a touch input device such as a keyboard, mouse, pen, or trackball, a voice input device, a scanning device, or another device that provides input to the computing environment 300. For video encoding, the input device(s) 350 may be a camera, video card, TV tuner card, or similar device that accepts video input in analog or digital form, or a CD-ROM or CD-RW that reads video samples into the computing environment 300. The output device(s) 360 may be a display, printer, speaker, CD-writer, or another device that provides output from the computing environment 300.

The communication connection(s) 370 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the figures may not show the various ways in which the disclosed methods can be used in conjunction with other methods.

Any of the disclosed methods can be implemented as computer-executable instructions stored on one or more computer-readable storage media (e.g., non-transitory computer-readable media, such as one or more optical media discs, volatile memory components (such as DRAM or SRAM), or nonvolatile memory components (such as flash memory or hard drives)) and executed on a computer (e.g., any commercially available computer, including smart phones or other mobile devices that include computing hardware). As should be readily understood, the term computer-readable storage media does not include communication connections, such as modulated data signals. Any of the computer-executable instructions for implementing the disclosed techniques as well as any data created and used during implementation of the disclosed embodiments can be stored on one or more computer-readable media (e.g., non-transitory computer-readable media, which excludes propagated signals). The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Adobe Flash, or any other suitable programming language. Likewise, the disclosed technology is not limited to any particular computer or type of hardware. Certain details of suitable computers and hardware are well known and need not be set forth in detail in this disclosure.

It should also be well understood that any functionality described herein can be performed, at least in part, by one or more hardware logic components, instead of software. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc. Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

As used herein, "publisher" is defined as the publisher of at least one application, i.e., the party that controls and directs publication of the application to customers. An application can generally be understood to be a program or programs directed to end users. A publisher's application(s) are typically available to end users for download to their computing devices through an online store. In the case of mobile devices, such stores include Marketplace (the Windows Phone Apps+ Games Store), iTunes, Google Play and other similar sites. Because the publisher controls and directs publication of its applications, it is usually the owner or licensee of rights to the applications, although this is not a requirement. In some cases, the publisher of an application is also the developer of the application, i.e., the individual or individuals who wrote the application, but this is also not a requirement.

In the first identification scenario, it is desired to allow each publisher to identify a mobile device (and mobile device user) when that publisher's application(s) are associated with that device, but not to allow that publisher to readily access identifiers for mobile devices on which none of the publisher's applications is associated. In addition, publishers cannot meaningfully share identifiers with each other because each publisher has a different identifier. Each publisher can still target content to mobile devices (and their users) when appropriate, but the publisher's actions in doing so will not inadvertently make users' private information public. Further, any identifier of a mobile device user is an anonymous identifier that allows the publisher to discern between first and second mobile device users, but they remain anonymous to the publisher.

According to described approaches, private information stored in memory on the mobile device is hashed to provide a public identifier, and the public identifier is provided to the application. In this way, the mobile device and the user can be appropriately identified to the application on the mobile device, and content from the application publisher directed to the mobile device or the user can be suitably directed.

Figure 4:
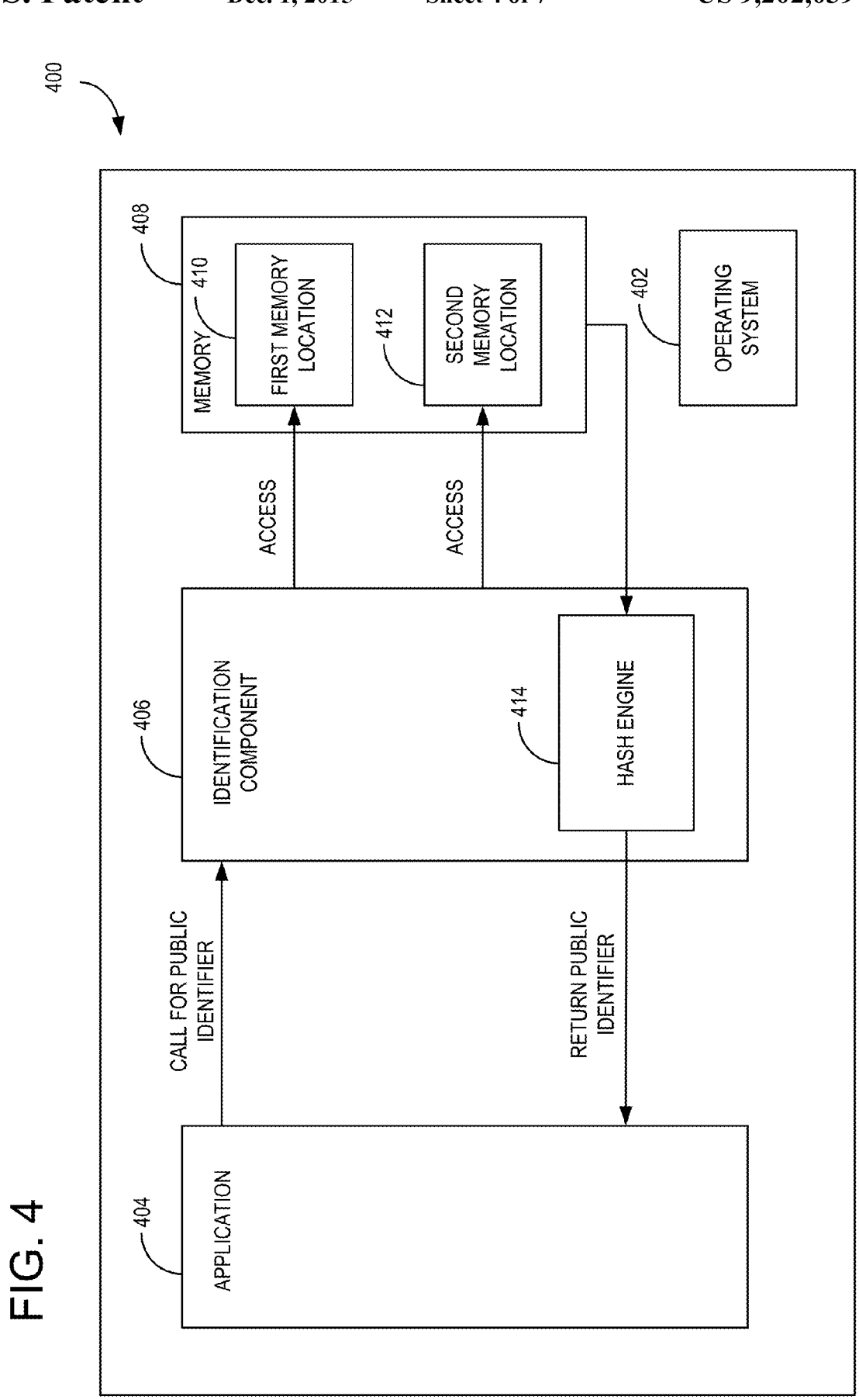
FIG. 4 is a block diagram of a mobile device having an identification component.

Referring to FIG. 4, a specific implementation is illustrated. In an exemplary mobile device 400, an operating system 402 provides for interaction between an application 404 present on the device, an identification component 406 and a memory 408. The application 404 requests a public identifier, such as in a function call directed to the identification component 406. The identification component responds to the request by accessing private data identifying the mobile device and the user, and then hashing the private data in the hash engine 414 with stored public data, to create a public identifier. One suitable hashing algorithm is HMAC-SHA256, but one or more other alogorithms can also be used. In addition to hashing, other operations that preserve the secrecy of the private information can also be used. The public identifier is then returned to the application.

In a specific implementation, the private data includes a private anonymous identifier that identifies a user of the device, e.g., by the user's account on a service used by the device. The private data also includes a private device unique identifier that identifies the device. In the implementation shown in FIG. 4, the stored public data includes a publisher identifier (publisher ID). This publisher ID can be the publisher name or another designator assigned to the publisher.

In one sequence, it is the private device unique identifier that is hashed together with the publisher identifier to yield the public identifier, in this case, a public device unique identifier. In another sequence, it is the private anonymous identifier that is hashed together with the publisher identifier to yield a second public anonymous identifier. In the illustrated implementation, both sequences are used: the private device unique identifier is accessed from one memory location (e.g., 410 or 412), the private anonymous identifier is accessed from a different memory location (e.g., 412 or 410, respectively), each is hashed in a separate hash operation with the publisher identifier, and the resulting public identifier is in fact two public identifiers, i.e., a public device unique identifier and a public anonymous identifier.

These relationships are summarized in the following table:

| Private Data | | Stored Public Data | Public Identifier | |
|---|---|---|---|---|
| Private Anonymous Identifier | Private Device Unique Identifier | Publisher Identifier (Publisher ID) | Public Anonymous Identifier | Public Device Unique Identifier |

Figure 7:
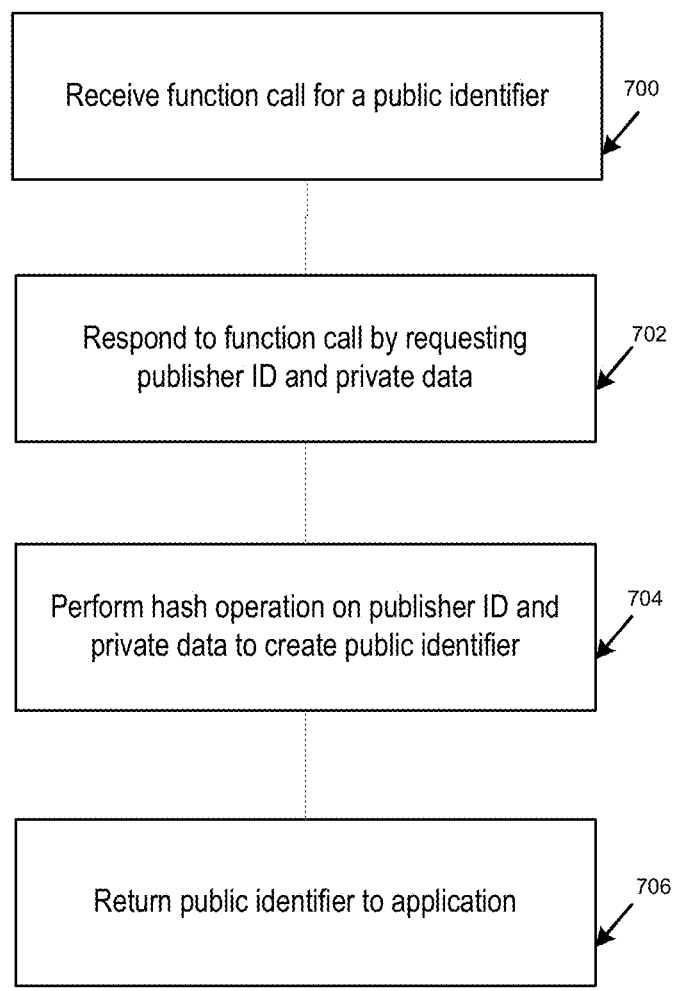
FIG. 7 is a flow chart of an exemplary method.

In FIG. 7, steps of an exemplary method are shown. In step 700, a function call for a public identifier is received by the identification component. In step 702, the identification component responds to the function call by requesting a publisher ID from a first memory location (e.g., the memory location 410) within the device and requesting private data from a second memory location (e.g., the memory location 412) within the device. In step 704, the identification component then performs a hash operation on the publisher ID and the private data to create the public identifier. In step 706, the public identifier is returned to the application.

In an alternative method, there is a third memory location (not specifically shown in the drawing) in which a second piece of private data is stored. A second hash operation (which may be the same as, or preferably, different from the first hash operation) is conducted on the publisher ID and the second piece of private data, yielding a second public identifier. The second public identifier is also returned to the application.

Figure 5:
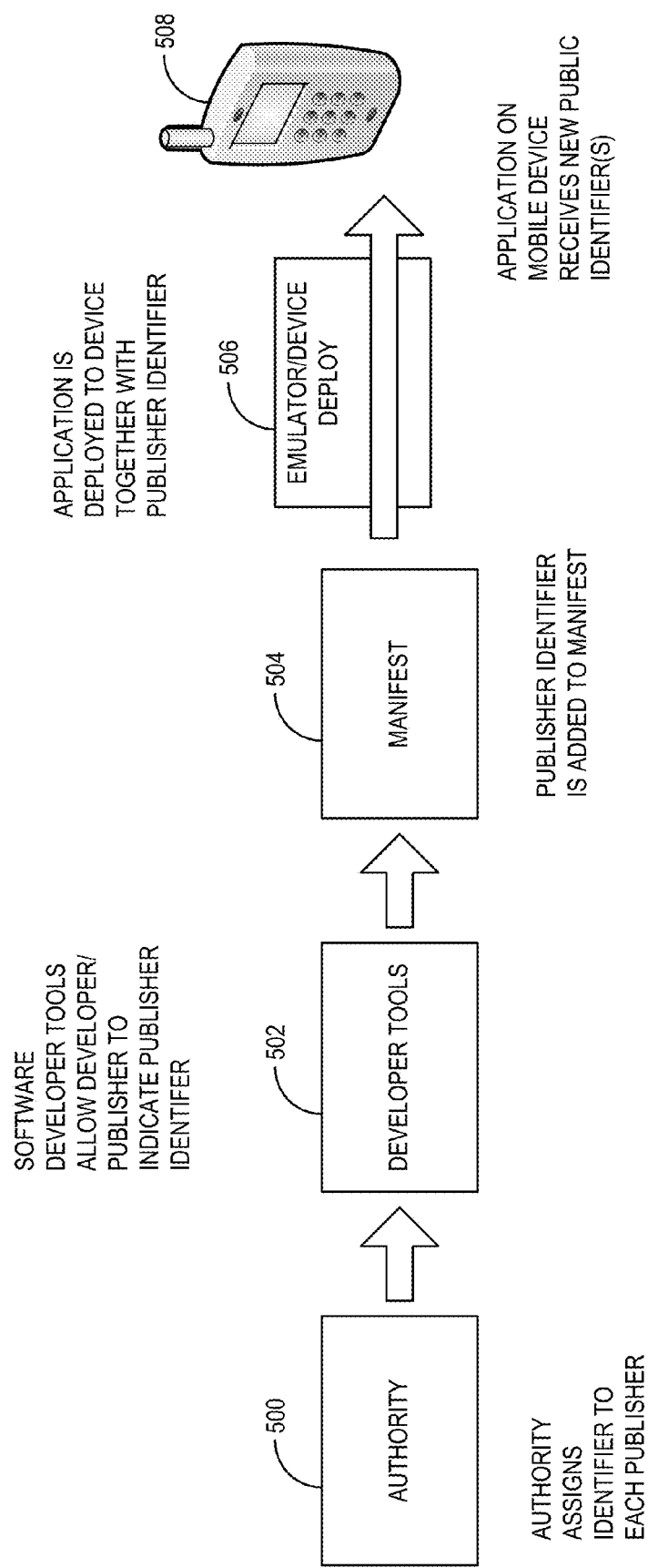
FIG. 5 is a process flow diagram showing an exemplary implementation of allowing a developer to test an application.

In the second identification scenario, a publisher seeking to test its application needs the ability to set an identifier so that testing of the application on an operating mobile device can be completed. An exemplary implementation is illustrated in FIG. 5. In the process block 500, an authority assigns each publisher an identifier. In the process block 502, as the developer undertakes development of an application, the developer can specify the publisher identifier in the software development tools. In the process block 504, when the developer indicates that a test of the application is desired, a manifest is updated to include the publisher identifier. In the process block 506, a copy of the application together with the publisher identifier is deployed to an identified mobile device or an emulator of the device operating on another computing device. In the process block 508, initiation of the application causes the mobile device to receive new public identifier(s). Thus, any prior corresponding public identifiers are updated.

The publisher identifier(s) received by the mobile device or the emulator in process block 508 are only operable for the test copy of the application. Thus, once testing is completed, if the developer or publisher then submits the application to the authority for full publication as an application available for users to download, then the process in FIG. 6 takes place.

Figure 6:
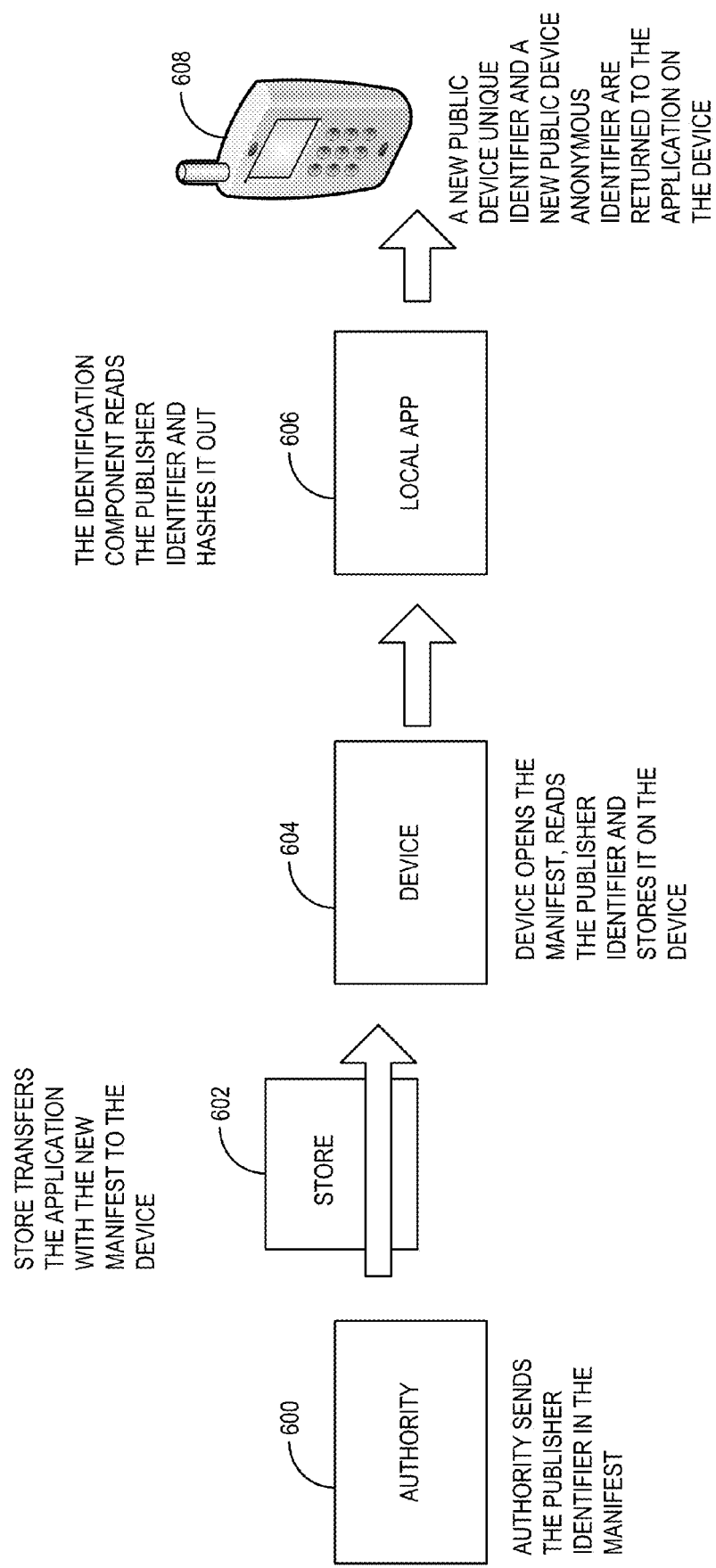
FIG. 6 is a process flow diagram showing an exemplary implementation of downloading an application from a store with the new identification methods.

An exemplary implementation of downloading a new application to a mobile device using the described identification methods is shown in FIG. 6. In process block 600, the authority sends the publisher identifier in the manifest to the store. In process block 602, the store transfers a copy of the application with the new manifest to the mobile device. In process block 604, the mobile device opens the manifest, which is a file, reads the publisher identifier and stores the publisher identifier on the device. In process block 606, the identification component reads the publisher identifier and hashes it out according to the methods described above. In process block 608, a new public device unique identifier and a new public anonymous identifier are returned to the application on the device.

The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved.

In view of the many possible embodiments to which the disclosed principles may be applied, it should be recognized that the illustrated embodiments are only preferred examples and should not be taken as limiting the scope of protection. Rather, the scope is defined by the following claims. We therefore claim all that comes within the scope and spirit of these claims.

We claim:

1. A method implemented by a processor on a computing device for identifying the device and/or a user to an application on the device, comprising:
    receiving a function call for a public identifier;
    responding to the function call by requesting a publisher ID, comprising accessing a private device unique ID from an operating system of the device;
    responding to the function call by requesting private data from a memory location within the device;
    performing a hash operation on the private device unique ID and the private data to create the public identifier; and
    returning the public identifier to the application.

2. The method of claim 1, wherein the public identifier is unique to the application's publisher.

3. The method of claim 1, wherein the public identifier is a first public identifier, further comprising responding to the function call by requesting additional private data from another memory location, performing a hash operation on the publisher ID and the additional private data, and returning a second public identifier to the application.

4. The method of claim 3, wherein at least one of the first public identifier and the second public identifier is specific to a publisher of the application.

5. The method of claim 3, wherein one of the first public identifier and the second public identifier is a public anonymous identifier identifying a first mobile device user among other mobile device users uniquely and anonymously to the publisher.

6. The method of claim 1, wherein returning the public identifier to the application comprises communicating the public identifier to the application's publisher.

7. A method implemented by a processor on a computing device for identifying the device and/or a user to an application on the device, comprising:
    receiving a function call for a public identifier;
    responding to the function call by requesting a publisher ID from a first memory location within the device;
    responding to the function call by requesting private data from a second memory location within the device, comprising accessing a private anonymous identifier from an operating system of the device;
    performing a hash operation on the publisher ID and the private anonymous identifier to create the public identifier; and
    returning the public identifier to the application.

8. The method of claim 7, wherein responding to the function call by requesting a publisher ID comprises accessing a publisher name from an operating system of the device.

9. A mobile device associated with at least one application seeking to identify the mobile device and/or a user of the device, the mobile device comprising:
    at least one processor; and
    memory linked to the processor and having at least a first memory location in which a publisher ID is stored and a second memory location in which private data is stored, the memory also having instructions that cause the processor to:
    receive a function call for a public identifier;
    respond to the function call by at least one of (1) requesting a publisher ID from the first memory location, the publisher ID comprising a unique publisher designation, or (2) requesting private data from the second memory location, the private data comprising a private anonymous identifier;
    perform a hash operation on the publisher ID and private data to create a public identifier; and
    return the public identifier to the application.

10. The mobile device of claim 9, wherein the public identifier is unique to the application's publisher.

11. The mobile device of claim 9, wherein the public identifier is a first public identifier, further comprising responding to the function call by requesting additional private data from a third memory location, performing a hash operation on the publisher ID and the additional private data, and returning a second public identifier to the application.

12. The mobile device of claim 9, wherein responding to the function call by requesting a publisher ID comprises accessing a private device unique ID from an operating system of the device.

13. The mobile device of claim 9, wherein the private anonymous identifier is accessed from an operating system of the device.

14. The mobile device of claim 9, wherein at least one of requesting a publisher ID or requesting private data comprises accessing a secure area of the device.

15. The mobile device of claim 9, wherein at least one of the first memory location or the second memory location comprises a location in binary.

16. The mobile device of claim 9, further comprising communicating the public identifier to the application's publisher.

* * * * *